(12) United States Patent
Scheck et al.

(10) Patent No.: US 6,604,619 B1
(45) Date of Patent: Aug. 12, 2003

(54) TWO-DIRECTIONAL MANUAL DRIVE

(75) Inventors: Georg Scheck, Weitramsdorf (DE); Peter Schumann, Untersiemau (DE)

(73) Assignee: Brose Fahrzeugteile GmbH & Co. KG, Coburg (DE)

( * ) Notice: Subject to any disclaimer, the term of this patent is extended or adjusted under 35 U.S.C. 154(b) by 0 days.

(21) Appl. No.: 09/856,630
(22) PCT Filed: Nov. 18, 1999
(86) PCT No.: PCT/DE99/03676
§ 371 (c)(1),
(2), (4) Date: Sep. 12, 2001
(87) PCT Pub. No.: WO00/30890
PCT Pub. Date: Jun. 2, 2000

(30) Foreign Application Priority Data

Nov. 24, 1998 (DE) .......................... 198 55 285

(51) Int. Cl.[7] ................................. B60N 2/44
(52) U.S. Cl. ..................... 192/19; 192/15; 192/223
(58) Field of Search ................. 192/223, 223.1, 192/15, 19, 54.5, 75, 76; 297/374

(56) References Cited

U.S. PATENT DOCUMENTS

| | | | | |
|---|---|---|---|---|
| 485,635 A | * | 11/1892 | Lake et al. .............. | 192/15 |
| 1,937,626 A | * | 12/1933 | Briggs .................... | 192/15 |
| 3,250,352 A | * | 5/1966 | Morgan .................. | 192/223 |
| 4,533,027 A | * | 8/1985 | Otani et al. ............. | 297/374 |
| 4,850,466 A | * | 7/1989 | Rogakos et al. ......... | 192/76 |
| 5,011,223 A | | 4/1991 | Kato ...................... | 297/284 |
| 5,382,076 A | | 1/1995 | Scheck et al. ........... | 297/354.12 |
| 5,445,250 A | * | 8/1995 | Koschinat ............... | 192/76 |
| 5,865,285 A | | 2/1999 | Minkenberg et al. .... | 192/15 |
| 5,881,854 A | | 3/1999 | Rougnon-Glasson .... | 192/15 |
| 5,908,101 A | * | 6/1999 | Watanabe ............... | 192/15 |

FOREIGN PATENT DOCUMENTS

| | | |
|---|---|---|
| DE | 36 08 858 | 10/1987 |
| DE | 37 04 954 | 5/1988 |
| DE | 36 43 195 A1 * | 6/1988 |
| DE | 37 15 726 | 12/1988 |
| DE | 43 09 334 | 9/1993 |
| DE | 44 05 870 | 8/1995 |
| DE | 197 26 257 | 1/1998 |
| DE | 198 07 790 A1 * | 9/1999 |
| FR | 2 750 186 | 12/1997 |
| WO | WO 96/23672 | 8/1996 |
| WO | WO 97/40295 | 10/1997 |

* cited by examiner

Primary Examiner—Rodney H Bonck
(74) Attorney, Agent, or Firm—Christie, Parker & Hale, LLP

(57) ABSTRACT

A two-directional manual drive which produces a rotational movement, starting from the neutral position of a drive lever which can pivot around a drive axis whereby the rotational movement can occur in a selective manner in one of two rotational directions, includes a driven element having a driving surface, on which bearing surfaces of coupling elements are placed in frictional engagement when the drive lever is rotated out of a neutral position, displacing the driven element in the direction of the periphery. When the drive lever is returned to the neutral position the coupling elements are released from a position of frictional engagement with respect to the cylindrical driving surface so that the driven element is no longer displaced.

12 Claims, 2 Drawing Sheets

TWO-DIRECTIONAL MANUAL DRIVE

CROSS-REFERENCE TO RELATED APPLICATION

This application claims priority of International application number PCT/DE99/03676, filed Nov. 18, 1999, which in turn claims priority to German patent application number 198 55 282.8, filed Nov. 24, 1998.

FIELD OF INVENTION

The invention relates to a two-directional manual drive which produces a rotational movement. A drive of this kind is suitable in particular for manually adjusting the height or rake of a vehicle seat.

BACKGROUND OF THE INVENTION

A two-directional drive is known from DE 43 09 334 A1 wherein force transfer from a drive lever to a driven shaft takes place through friction locking elements which are mounted on the shaft. When the drive lever is moved away from the neutral position of the drive lever the friction locking elements clamp with the shaft and transfer torque introduced on the drive side to the shaft.

The friction locking elements thus have a friction-conditioned self-locking action when entering into the drive phase with the surface of the shaft which is to be driven. It is thereby ensured that the friction torque is intensified in dependence on the drive torque itself so that large forces can also be transferred. During the reverse movement of the drive lever back towards its neutral position the self-locking action is however lifted and the friction torque is kept as small as possible.

Controlling the conditions of the self-locking action is undertaken by an elastic switching element. Swivel movement of the drive lever beyond its neutral position leads to the expansion of the elastic switching element which is designed in particular as a shaped wire spring. The tangentially acting force which is thereby produced causes tilting and tensioning processes within the scope of the proposed play of the drive device so that the self-locking action can become active and intensified.

In the event of a return of the drive lever to the neutral position the one spring end of the elastic switching element exerts a tangential force on the friction locking elements through a bolt whereby this force acts in the swivel direction of the drive lever and lifts the self-locking properties so that the shaft is prevented from jamming and turning back.

From FR-A 2 750 186 a drive mechanism for producing a rotational movement is known which takes place starting from a neutral position of a drive lever which can pivot about a drive axis selectively in one or other rotational direction. A driven element is only turned when the drive lever is moved away from the neutral position whilst when the drive lever is moved into the neutral position the driven element is not displaced. In order to produce the rotational movement the driven element has internal teeth which interact with two locking pawls mounted on a fixed flange. A toothed segment-shaped disc which is able to swivel about a cam connected to the drive lever with diametric play has two driving pawls of which during activation of the drive lever the driving pawl corresponding to the direction of rotation of the drive lever, as well as the corresponding locking pawl, are brought into engagement with the internal teeth of the driven element whilst the other driving pawl and the locking pawl are kept out of engagement with the internal teeth of the driven element.

The known drive mechanism for producing a rotational movement is automatically locked after each operation of the drive lever so that no additional locking device is required which blocks torque on the driven side but transfers torque on the drive side arising from the drive lever to the device which is to be driven. When the drive lever returns to the neutral position the teeth of the driving pawls are brought out of engagement with the internal teeth of the driven element.

From WO 96 23672 A, a two-directional manual drive is known for producing a rotational movement by means of a drive lever which starting from a neutral position can pivot with restricted angle into one or other rotational direction, through which a shaft is rotated when the drive lever is moved away from its neutral position while the drive lever is pivoted in the direction of the neutral position the shaft is not displaced. The drive lever which is mounted on an axis is provided with swivel detent elements while the ends provided with teeth engage into the teeth arranged round the periphery of a drive wheel. A slide guide is associated with the detent elements and lifts each unloaded detent element out from the teeth of the drive wheel. Furthermore a locking device is connected to the drive shaft so that torque on the output side is blocked while torque on the drive side is transferred.

SUMMARY OF THE INVENTION

The object of the present invention is to provide a two-directional manual drive for producing a rotational movement which enables infinite transfer of torque from a drive lever to a driven element, operates without play and noise and which can also be readily used, i.e. without greater demands on tolerance, as a locking clutch with a substantially matching construction with a two-directional drive mechanism and can, therefore, be manufactured cost-effectively.

According to one embodiment of the present invention, a driven element has a cylindrical shaped driving surface arranged concentric with a drive axis and on which bearing surfaces of coupling elements are placed in non-positive fit when the drive lever is rotated out of a neutral position. In this way the driven element is entrained in the direction of the periphery. When the drive lever is returned to the neutral position the coupling elements are released from a position of non-positive fit so that the driven element is no longer displaced as the drive lever is returned into the neutral position.

The solution has the particular advantage that it can be constructed without any spring-elastic switching element. In this way external factors, such as dirt or the like, have substantially little effect or even no effect whatsoever on the functioning of the drive according to the present invention so that proper functioning of the drive according to the present invention is always guaranteed. This also applies in the event of long-lasting and high strain on the drive.

The drive according to the invention preferably has circular section coupling elements which are placed against the cylindrical driving surface through bearing faces of their partially circular shaped surfaces which are opposite the cylindrical shaped driving surface of the driven element. With this embodiment advantageous that the formation of the bearing faces of the coupling elements matches the cylindrical shaped formation of the driving surface so that a particularly good force-locking or frictional engagement connection between the bearing faces of the coupling elements and the cylindrical drive face of the output element becomes possible.

In another preferred embodiment of the drive according to the invention a drive element is mounted between the coupling elements. Furthermore expanding flanks of the coupling elements are arranged at such a distance from the drive axis that a substantially radially aligned force produces the frictional engagement between the coupling elements and the cylindrical driving surface. In the event of the drive lever being moved out from its neutral position, the bearing faces of the coupling elements for transferring torque on the drive side adjoin with a frictional engagement against the cylindrical driving surface of the driven element.

In a further preferred embodiment the bearing faces of the coupling elements adjoin the cylindrical driving surface of the driven element elastically pretensioned by at least one spring element, for example a compression or leaf spring. The spring element thereby preferably bears against the coupling elements in the centre of at least one of the bearing faces and presses these apart from each other in the direction of the periphery until they bear on the drive element with their expanding flanks which are each turned remote from the spring element relative to the drive axis. With this embodiment it is advantageous if the coupling elements bear free of play against both the cylindrical driving surface of the driven element and against the drive element so that a play-free drive becomes available.

In a further preferred embodiment of the present invention, the spring element is placed with positive engagement around at least one angled claw of the drive element and presses the adjoining expanding flanks of the coupling elements apart. For this a W-spring is preferably provided whose ends bear against facing radial end stops of the coupling elements and whose centre section is placed around an angled claw of the drive element. The use of such a spring element ensures a particularly reliable and play-free bearing of the expanding flanks remote from the spring element against the drive element or of the coupling elements against the cylindrical driving surface of the driven element.

In a further preferred embodiment of the present invention, the drive has two coupling elements of identical design arranged symmetrically relative to the drive axis and between which is mounted the drive element which is connected to the drive axis and drive lever. The drive element is thereby formed as a drive vane which, when the drive lever is displaced to transfer torque on the drive side, engages on the facing expanding flanks of the coupling elements so that a substantially radially aligned force produces the frictional engagement between the coupling elements and the cylindrical-shaped driving surface of the driven element. The bearing faces of the coupling elements thus for transferring a torque on the drive side bear against the cylindrical driving surface of the driven element with non-positive fit.

With this embodiment it is advantageous that, as a result of the symmetrical arrangement and the identical design of the coupling elements, the bearing faces of the coupling elements are uniformly distributed around the periphery of the cylindrical driving surface of the driven element so that, when the drive lever is displaced, a particularly good non-positive force-locking connection is produced between the coupling elements and the cylindrical shaped driving surface of the driven element.

With the drive according to the invention a releasing element is preferably provided which has releasing claws which are arranged in recesses of the partially circular-shaped surfaces of the coupling elements opposite the driving surface. Furthermore the releasing element has a spring shackle which is coupled to a restoring spring.

After the drive lever has been displaced from its neutral position the restoring spring and the releasing claws of the releasing element cause the drive lever to return to its neutral position. On letting go the drive lever or operating the drive lever with reduced force no more torque is introduced on the drive side or the torque introduced on the drive side is reduced. As a result of the absence of or reduced radially aligned force the non-positive bearing of the coupling elements against the cylindrical driving surface of the driven element is lifted or reduced.

The restoring spring which is tensioned when the drive lever is turned now acts with its spring force so that the releasing claws of the releasing element press in the direction of the periphery against the stop faces of the recesses of the coupling elements and draw back the coupling elements in the direction of the periphery. The spring force is thereby selected so that the pressing of the free switching claws also overcomes a reduced force-locking connection between the coupling elements and the cylindrical driving face of the driven element.

As a result of the movement of the coupling elements by the releasing claws of the releasing element the drive element which is connected to the drive lever is also entrained along so that the drive lever is also returned to its neutral position. On the other hand the driven element is not drawn back since the force-locking bearing of the coupling elements against the cylindrical drive face of the driven element is lifted or reduced so that torque is not transferred to the driven element.

A coil spring with two ends bearing against a housing stop and against the spring shackle of the releasing element is preferably provided as the restoring spring. Springs of this type have a sufficiently high spring force to return the drive lever to its neutral position. Furthermore springs of this kind can be easily integrated in the structural space directly adjoining the drive lever. In this way the complexity of the drive is increased and space is spared.

In a further embodiment of the invention, the driven element is connected on the driven side to a locking clutch which on the one hand blocks non-positively torque introduced from the driven side of the locking clutch and on the other side transfers to the driven side torque which is introduced on the drive side and is transferred from the driven element to the locking clutch. When using a locking clutch of this kind it is advantageous if no displacement of the drive takes place in the event of external forces, more particularly crash forces.

The locking clutch preferably has a clutch housing with a cylindrical brake surface. Furthermore, brake shoes are mounted in the clutch housing and with a part of their outside faces bear elastically pretensioned against the cylindrical brake surface of the clutch housing. The brake shoes are preferably formed uniform with the coupling elements.

Furthermore, the driven element is connected to a follower wheel of the locking clutch which preferably has cylinder sleeve shaped follower claws which are arranged with torsion angle play with positive fit between two substantially radial stop faces of the brake shoes. The driven side of the locking clutch furthermore has a driven vane arranged between the facing expanding flanks of the brake shoes.

The locking clutch is therefore constructed practically in accordance with the drive described above. Individual component parts, for example, the coupling elements or the brake shoes can therefore be used for both the drive described and for the locking clutch, which reduces the manufacturing costs.

The locking clutch has a different function from the drive described above. Under the action of torque introduced from the driven side of the locking clutch the driven vane presses the outside surfaces of the brake shoes with frictional engagement against the cylindrical brake surface of the clutch housing so that torque transfer is blocked.

In the event of torque transferred from the driven element to the locking clutch no such locking action occurs. Rather the driven element acts with the follower claws so that these press in the direction of the periphery on the radial stop faces of the brake shoes and reduce or lift the force-locking contact of the brake shoes on the cylindrical brake surface so that the follower claws during rotary movement entrain the brake shoes and thus also the driven vane. In this way torque introduced through the drive lever on the drive side is transferred to the driven side.

BRIEF DESCRIPTION OF THE DRAWINGS

These and other features of the present invention will now be explained in further detail with reference to the specification, claims, and drawings wherein:

DETAILED DESCRIPTION

Figure 1:
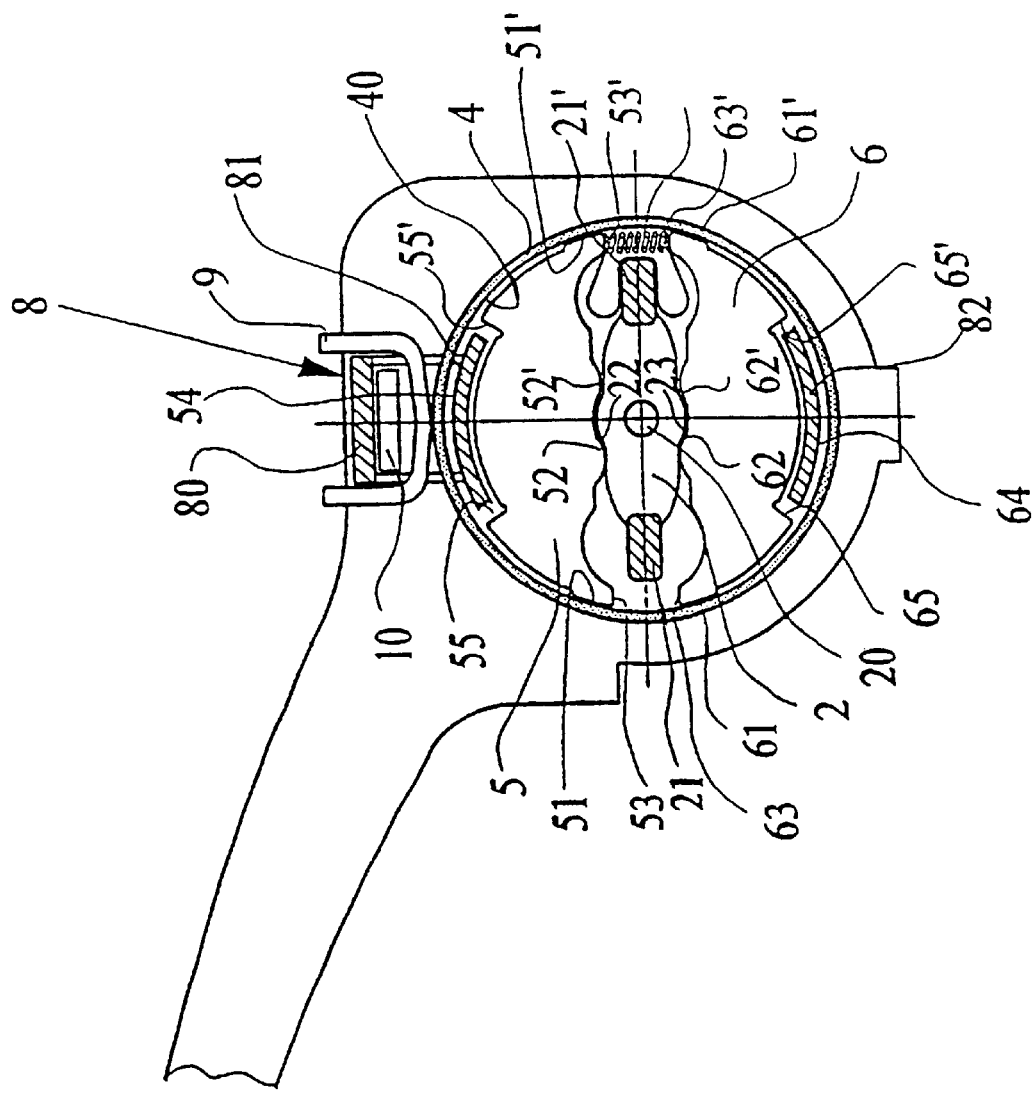
FIG. 1 is a sectional view of a drive according to an embodiment of the invention.
Figure 1:
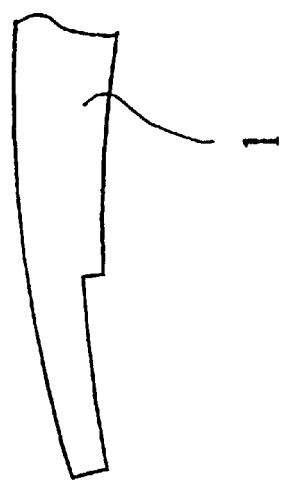

The embodiment according to FIG. 1 shows the basic structure of a two-directional manual drive which is suitable in particular for manually adjusting the height or incline of a vehicle seat. The following first deals with the construction of the drive and then with the functional interaction of the individual elements of the drive.

The drive has a drive lever 1 mounted on a drive axis 20, a drive element 2 connected to the drive lever 1, as well as a driven element 4 whose cylindrical driving face 40 is mounted concentric with the drive axis 20.

The drive element 2, which is formed as a drive vane and has two diametrically opposite angled claws 21 and 21', is mounted between two coupling element 5 and 6, which are of identical design and are arranged symmetrical to the longitudinal axis of the drive element 2. The coupling elements 5 and 6 are substantially circular section in shape. Each of the two coupling elements 5 and 6 has a pair of expanding cams 52 and 52' and 62 and 62' respectively which in interaction with the drive element 2 produce a substantially radially aligned force whereby the contact bearing faces 51, 51' or 61, 61' of the coupling elements 5, 6 are connected in friction-locking engagement with the driven element.

In addition to the bearing faces 51 and 51' and 61 and 61', radial end stops 53 and 53' and 63 and 63', respectively, are arranged at the two ends of the coupling elements 5 and 6. The two radial end stops 53, 63 and 53', 63', respectively, of the coupling elements 5 and 6 thereby each lie opposite one another.

A W-spring 7 is mounted between the two adjoining radial end stops 53' and 63' of the coupling elements 5 and 6 whereby the ends of the spring adjoin the radial end stops 53', 63' and its center section is placed with positive-locking connection about the angled claw 21' of the drive element 2 which is arranged close to the end stops 53', 63'.

As a result of the W-spring 7, the coupling elements 5 and 6 are elastically pretensioned so that the bearing faces 51, 51', 61 and 61' of the coupling elements 5 and 6 freely adjoin, free of play, the cylindrical shaped drive face 40 of the driven element 4. Furthermore the W-spring 7 presses on the two end stops 53' and 63' of the coupling elements 5 and 6 so that the two adjoining expanding flanks 52' and 62' of the coupling elements 5 and 6 are forced apart. On the other hand, the two adjoining expanding flanks 52 and 62 of the coupling elements 5 and 6, remote from the W-spring 7, are pressed by the W-spring 7 against the drive element 2 so that the two expanding flanks 52 and 62 adjoin the drive element 2 free of play.

It is a particular advantage here that a play-free drive is provided through the play-free contact of the coupling elements 5 and 6 against both the cylindrical driving surface 40 of the driven element 4 and the drive element 2.

The two coupling elements 5 and 6 have recesses 54, 64 on the partial circular faces opposite the cylindrical driving surface 40 of the driven element 4, with the releasing claws 81 and 82 of a releasing element 8 mounted in these recesses. The releasing claws 81 and 82 press in the direction of the periphery against the stop faces 55, 55' and 65, 65' respectively of the recesses 54 and 64. The releasing element 8 furthermore has a spring shackle 80 which is coupled to a restoring spring 9.

In this embodiment, a coil spring is used as the restoring spring 9. The use of another suitable spring as restoring spring is also possible. The coil restoring spring 9 used here has two free ends which both adjoin, under tension, the stop 10 fixed on the housing or the spring shackle 80 of the releasing element 8.

When the drive lever 1 is moved beyond its neutral position, torque on the drive side is initiated into the drive. As a result of this the drive element 2 connected to the drive lever 1 engages on the facing expanding flanks 52 and 62 so that a substantially radially aligned force produces a non-positive fitting connection between the coupling elements 5 and 6 and the cylindrical driving surface 40 of the driven element 4. The bearing faces 51, 51', 61 and 61' of the coupling elements 5 and 6 hereby bear with frictional engagement on the cylindrical driving surface 40 of the driven element 4 to transfer the torque on the drive-side. Only one of the two coupling elements 5, 6 is loaded each time through the drive element 2 depending on the direction of rotation.

As a result of the non-positive locking connection the driven element 4 is entrained by the coupling elements 5 and 6 when the drive lever 1 is rotated so that the torque introduced on the drive-side is transferred to the driven side.

When the drive lever 1 is moved beyond the neutral position the releasing element 8 and the end of the restoring spring 9 coupled to the spring shackle 80 of the releasing element 8 is displaced so that the restoring spring 9 is tensioned.

When the drive lever 1 is let go no more torque on the drive side is introduced into the drive. The drive element 2 therefore no longer engages on the expanding flanks 52 and 62 so that as a result of the absence of radially aligned force the force-locking contact of the coupling elements 5 and 6 against the cylindrical driving surface 40 of the driven element 4 is lifted.

As a result of the spring force of the restoring spring 9, the releasing claws 81 and 82 of the releasing element 8 press in the direction of the periphery against the stop faces 55 and 65' and 55' and 65, respectively, of the coupling elements 5 and 6 and draw these back in the direction of the periphery. The drive element 2 and thus also the drive lever 1 is entrained until the latter has reached its neutral position. On the other hand, when the coupling elements 5 and 6 are drawn back, the driven element 4 is not entrained since the non-positive contact of the coupling elements 5 and 6 against the cylindrical drive face 40 of the driven element 4 is lifted as a result of the absence of radially directed force.

Figure 2:
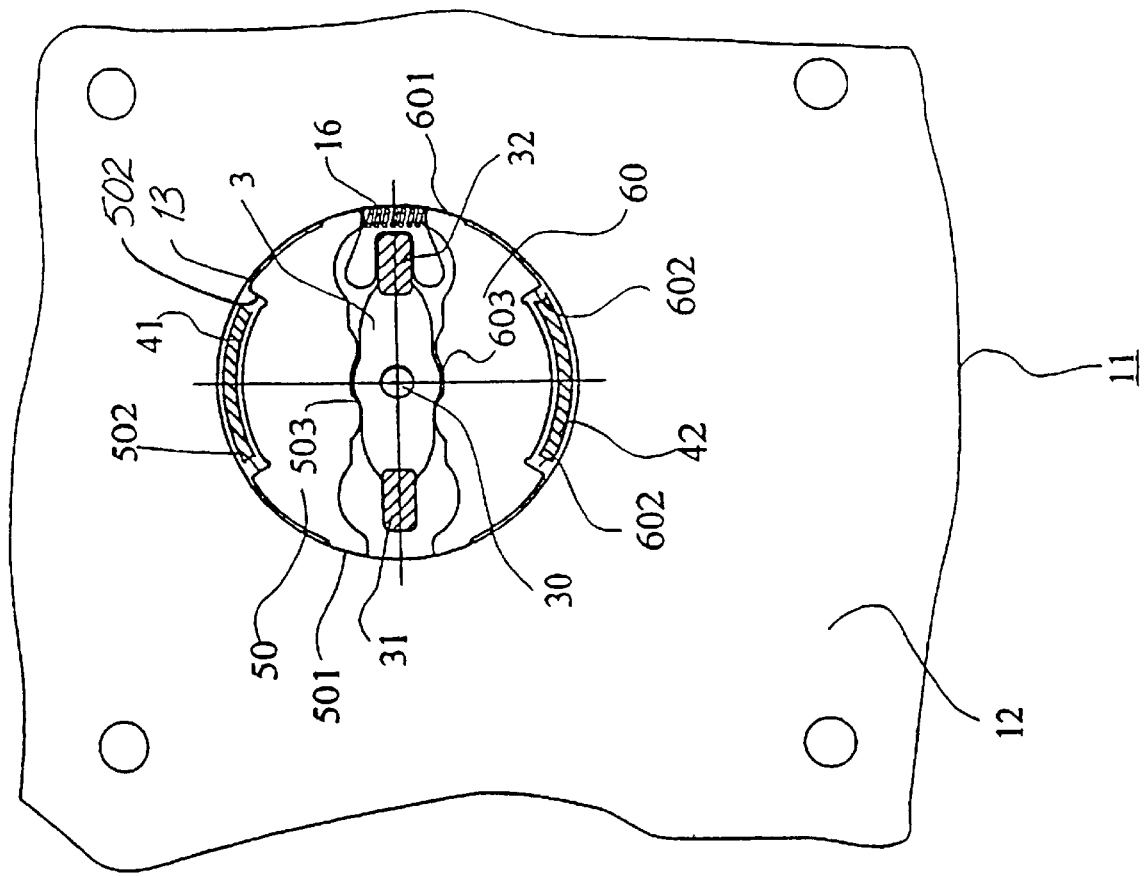
FIG. 2 is a sectional view of the drive according to an embodiment of the invention with a locking clutch.

FIG. 2 shows a further embodiment of the drive. The basic construction of this drive differs from the construction of the drive according to FIG. 1 only by a locking clutch 11 mounted on the drive. Therefore only the construction and the function of the locking clutch 11 will be described below. For the construction and function of the drive, reference is made to the information above.

The locking clutch 11 mounted on the drive side has a clutch housing 12 with a cylindrical brake surface 13. Furthermore, two brake shoes 50 and 60 of identical construction and arranged symmetrical relative to the driven axis 30 are mounted in the clutch housing 12. The design of the brake shoes 50 and 60 corresponds thereby to the design of the coupling elements 5 and 6 of the drive.

A driven vane 3 is mounted between the two brake shoes 50 and 60 and angled claws 31 and 32 are mounted at the ends thereof. The center section of a W-spring 6 whose ends adjoin facing radial end stops of the brake shoes 50 and 60 is placed with positive connection around the angle claw 32. Through the elastic pretension of the brake shoes 50 and 60 the contact bearing faces 501 and 601 of the brake shoes 50 and 60 adjoin the cylindrical brake surface 13 of the clutch housing 12 free of play. Furthermore, the brake shoes 50 and 60 are pressed apart in the peripheral direction so that these adjoin with their facing expanding flanks 503 and 603 free of play against the outer surface of the driven vane 3.

The driven element 4 is connected to a follower wheel of the locking clutch 11 which has cylinder sleeve shaped follower claws 41 and 42. These follower claws 41 and 42 are mounted with torsion angular play with keyed connection between two radial stop faces 502 and 602 of recesses of the brake shoes 50 and 60.

The locking clutch 11 of the drive according to the invention described here serves on the one hand to block torque introduced from the driven side of the locking clutch 11 and on the other to transfer to the driven vane 3 torque transferred from the driven element 4 to the locking clutch 11 and introduced from the drive side.

Under the action of torque introduced from the driven side of the locking clutch 11 the driven vane 3 presses the outside faces 501 and 601 of the brake shoes 50 and 60 with frictional engagement against the cylindrical brake surface of the clutch housing 12. Transfer of torque introduced on the driven side is hereby blocked. More particularly displacement of the drive is prevented in the event of external forces, for example, crash forces.

If torque introduced on the drive side is transferred from the driven element 4 to the locking clutch 11 then no such locking action occurs. With this transfer as a result of the connection of the driven element 4 with the follower claws 41 and 42 these claws are pressed in the peripheral direction against the radials top faces 502 and 602 of the brake shoes 50 and 60. An existing non-positive bearing contact of the bearing faces 501 and 601 of the brake shoes 50 and 60 against the cylindrical brake surface 13 of the clutch housing 12 is thereby lifted or at least reduced so that the brake shoes 50 and 60 are entrained in the direction of the periphery by the follower claws 41 and 42. In this way the driven vane 3 is also entrained.

What is claimed is:

1. A two-directional manual drive which produces a rotational movement for manually adjusting a vehicle seat, the manual drive comprising:

a drive lever having a neutral position, wherein the drive lever can pivot around a drive axis in a selective manner in one of two rotational directions;

a driven element having a cylindrical driving surface arranged concentric with the drive axis, the driven element being rotated only when the drive lever is rotated away from the neutral position and the driven element is not displaced when the drive lever is moved into the neutral position with;

coupling elements mounted between the drive element and the driven element to transfer torque on a drive side to the driven element, each of the coupling elements having spaced flanks;

the drive element mounted between the spaced flanks of the coupling elements, wherein the spaced flanks are arranged at such a distance from the drive axis that rotation of the drive element interacts with the coupling elements producing a substantially radially aligned force which produces friction engagement between the coupling elements and the driving surface of the driven element so that when the drive lever is rotated out of the neutral position in each of the rotational directions, bearing surfaces of the coupling elements are placed with frictional engagement against the driving surface of the driven element and the driven element is moved in the direction of the periphery; and wherein, when the drive lever is returned to the neutral position from each of the two rotational directions, the bearing surfaces of the coupling elements are released from frictional engagement with respect to the cylindrical driving surface.

2. The two-directional manual drive according to claim 1 wherein each of the coupling elements further has a circular section and wherein the bearing surfaces have partial circular surfaces opposite the cylindrical driving surface which bear against the cylindrical driving surface.

3. The two-directional manual drive according to claim 1 or 2 wherein the bearing surfaces of the coupling elements are elastically pretensioned against the cylindrical driving surface of the driven element by at least one spring element.

4. The two-directional manual drive according to claim 3 wherein the at least one spring element bears against the coupling elements in the vicinity of at least one of the bearing surfaces of the coupling elements and presses the coupling elements apart in the direction of the periphery that the coupling elements each abut the drive element with the spaced flanks, wherein the spaced flanks are oppositely facing expanding flanks.

5. The two-directional manual drive according to claim 3 wherein the at least one spring element is placed with positive locking engagement about at least one angled claw configured on the drive element, the at least one spring presses apart the adjoining expanding flanks of the coupling elements.

6. The two-directional manual drive according to claim 3 wherein the at least one spring element includes a W-spring whose ends bear against facing radial end stops of the coupling elements and a center section of the W-spring is placed around at least one angled claw of the drive element.

7. The two-directional manual drive according to claim 1 wherein the coupling elements are of identical design mounted symmetrical relative to the drive axis, wherein the drive element is formed as a drive vane and is connected to the drive axis, wherein the drive lever, mounted between the coupling elements and for transferring torque from the flanks of the coupling elements, engages on the facing expanding flanks of the coupling elements so that a substantially radially aligned force produces frictional engagement between the coupling elements and the driving surface so that the bearing surfaces of the coupling elements bear with frictional engagement against the driving surface of the driven element.

8. The two-directional manual drive according to claim 7 further comprising a releasing element having releasing claws and a spring shackle coupled to a restoring spring, the releasing claws mounted in recesses of the coupling elements, wherein each of the coupling elements has a partial circular section and the recesses are in the partial circular sections, and that the releasing claws press in the direction of the periphery against stop faces of the recesses and draw the coupling elements in the direction of the periphery until the drive lever has reached the neutral position.

9. The two-directional manual drive according to claim 8 wherein the restoring spring is formed as a coil spring with two free ends which are placed against a housing stop and the spring shackle of the releasing element.

10. The two-directional manual drive according to claim 1, wherein the driven element is connected on a driven side to a locking clutch which blocks, with frictional engagement, torque introduced from the driven side of the locking clutch and transfers torque from the driven element to the locking clutch.

11. The two-directional manual drive according to claim 10 wherein the locking clutch has a clutch housing with a cylindrical brake surface and brake shoes having outside faces, the brake shoes mounted therein with a part of the outside faces placed elastically pretensioned on the cylindrical brake surface of the clutch housing, wherein the driven element is connected to a follower wheel having shaped follower claws, the follower claws being mounted with rotational angular play in keyed engagement between two substantially radial stop faces of the brake shoes, and wherein the driven side of the locking clutch has a driven vane mounted between the facing expanding flanks.

12. The two-directional manual drive according to claim 11 wherein the coupling elements and the brake shoes are formed identical.

\* \* \* \* \*